Figure 1:
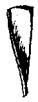

S. W. Baldwin,

Boot & Shoe Peg.

No. 3294. Reissued Feb. 9. 1869.

Inventor;

Stephen W. Baldwin

By his Atty

J. B. Crosby

Witnesses;

Francis Gould

J. B. Fidder

UNITED STATES PATENT OFFICE.

GORDON McKAY, OF BOSTON, MASSACHUSETTS, TRUSTEE OF THE McKAY SEWING MACHINE COMPANY, ASSIGNEE OF S. W. BALDWIN.

IMPROVED NAIL FOR LEATHER-WORK.

Specification forming part of Letters Patent No. 44,382, dated September 27, 1864; Reissue No. 3,294, dated February 9, 1869.

*To all whom it may concern:*

Be it known that STEPHEN W. BALDWIN, of Baldwinsville, in the county of Onondaga, State of New York, has invented an Improvement in Nailing Leather-Work, of which the following, taken in connection with the drawings which accompany and form part of this specification, is a description sufficient to enable those skilled in the art to practice the invention.

The invention relates principally to the manufacture of boots and shoes, and other articles of leather-work, with reference to the means employed to fasten together the soles and vamps of boots and shoes, and the parts of harness-traces, &c. The means employed for this purpose heretofore have been the various stitches made by hand and by machine, wooden pegs, (as seen in the common pegged boots and shoes,) and metallic nails, cement also being used to some extent.

This invention consists in a headless nail of peculiar construction, which nail may, if desirable, be driven into a hole previously prepared in the leather by an awl, or instrument having a form at its puncturing end corresponding or approximating to the form of the nail, as will be hereinafter set forth; the invention also consisting in pieces or articles of leather-work having their parts united by headless screw-threaded or twisted nails, which, being driven by percussive blows, turn as they are driven, and hold the parts securely together by reason of their twist.

The peculiarity of this improved nail which distinguishes it from all other headless nails is that it is made with a screw-thread, formed by a twisting thin edge or feather-like projection on each side of the nail, which projection, entering the leather laterally as the nail is driven, causes the threads to hold or, as it were, cling to the leather, and presenting a greater resistance to the extraction of the nail, and rendering parts secured thereby less liable to separation than if this twisting edge were formed of two adjacent planes or sides of a square or prismatic nail; and the invention consists in a twisted and headless screw-nail, (made to turn when driven,) having its threads formed of thin projections or salient edges.

One object of the improvement is to enable a nail to be constructed from thin sheet metal, having a holding-power beyond what is due to the form of the material as cut straight from a plate, a very strong holding-power being attained in a very slight amount of metal, which does not possess strength and rigidity enough to enable it to be driven into the leather, excepting by the preaction of the awl, but which, when driven in, has advantages in its holding-power far beyond that possessed by the common shoe-nails or wooden pegs.

Figure 2:
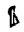
Figure 3:
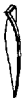
Figure 4:
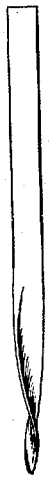

Figure 1 represents an elevation of the nail; Fig. 2, an end view of it; Fig. 3, an edge view of it; Fig. 4, a view of an awl or puncturing tool, which may be used to form a hole for entrance of the nail.

The nail shown in the drawings is cut or stamped out from a sheet or plate in a long and somewhat triangular form, (the top of the nail having a width very much greater than its thickness,) and a twist is then given in the length of the nail, the point, as shown, being twisted about ninety degrees, which amount, however, may be varied as circumstances may require.

The point of the awl (shown at Fig. 4) has a similar twist, the awl-point being made of sufficient strength or rigidity to enable it to be driven into the leather to make the puncture for the nail, the twist upon the awl giving the instrument a rotary motion as it is driven, conforming to said twist. Upon removal of the awl, the nail may be easily driven into place without bending or breaking it. The twist in the nail causes the pieces of leather to be held very firmly together. If the nail were regular in formation, the leather would easily slip upon the surface thereof; but when twisted, it must be turned, or one or both of the pieces of leather turned, before they can be separated, excepting by a greater strain than can be brought upon the pieces of leather by ordinary wear.

Now, if we suppose the center of the nail to be represented by a portion of metal square in section, or of a width equal to the thickness of the nail, then the metal on each side of this central part will form the projecting edge to which the twist is given, which edge, by its twist and by its shape in transverse section, has a holding-power superior to that possessed by any nail or peg heretofore made which could be driven by percussion, the entering edges preventing that disposition to rotate and loosen (under endwise strain) possessed by all other screw or twisted nails heretofore made to be driven by percussion, which turn as they are driven, by virtue of their twist.

As the lower end of the nail is quite narrow or tapering, the point is generally to be clinched upon the stock.

The great width given to the top of the nail shown in the drawings, in proportion to its thickness, prevents wear of the stock around or against the head sufficient to start the nail or to start the leather from position.

The nails are made headless, in order that the ends of the nail may be sunk flush with the surface into which they are driven, the same as are wooden pegs.

What is claimed is—

1. A headless nail, having thin twisting edges, substantially as described.

2. Articles of leather-work having their parts fastened together by headless screw-threaded or twisted nails, formed substantially as described.

GORDON McKAY,
*Trustee of the McKay Sewing-Machine Association.*

Witnesses:
J. B. CROSBY,
FRANCIS GOULD.